Figure 5:
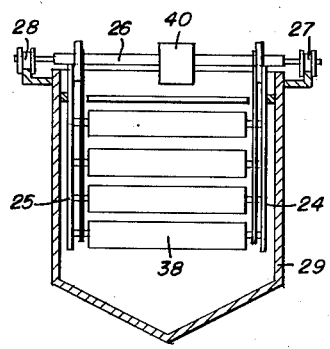

Aug. 11, 1959 C. BOUNIN 2,899,071
METHOD AND APPARATUS FOR ACCELERATING THE
DEGREE AND RATE OF SEPARATION
OF SOLIDS FROM LIQUIDS
Filed Nov. 21, 1955 3 Sheets-Sheet 1
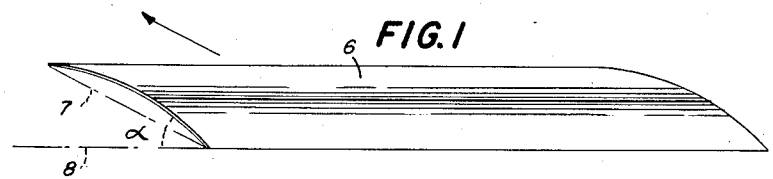
FIG. 1
FIG. 2
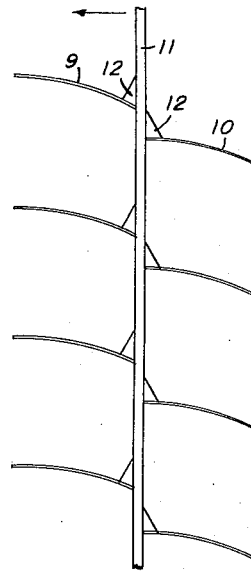
FIG. 3
FIG. 4
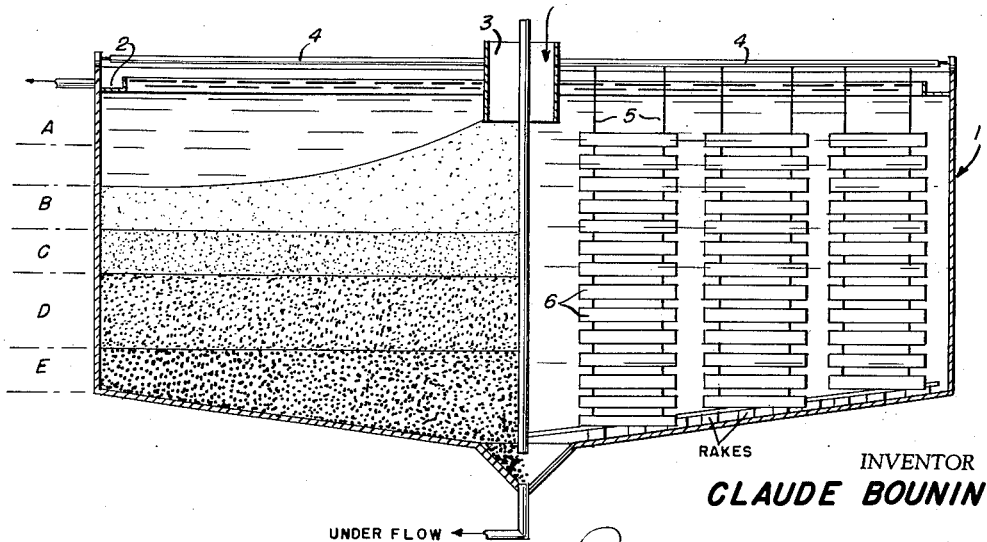
INVENTOR
CLAUDE BOUNIN
ATTORNEYS Aug. 11, 1959

C. BOUNIN 2,899,071

METHOD AND APPARATUS FOR ACCELERATING THE
DEGREE AND RATE OF SEPARATION
OF SOLIDS FROM LIQUIDS

Filed Nov. 21, 1955

3 Sheets-Sheet 2

INVENTOR
*CLAUDE BOUNIN*

ATTORNEYS

Aug. 11, 1959
C. BOUNIN
2,899,071
METHOD AND APPARATUS FOR ACCELERATING THE
DEGREE AND RATE OF SEPARATION
OF SOLIDS FROM LIQUIDS
Filed Nov. 21, 1955
3 Sheets-Sheet 3
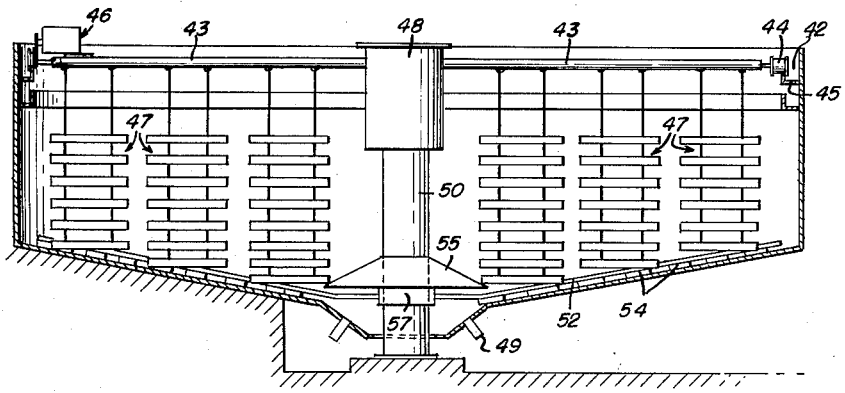
FIG. 8
FIG. 9
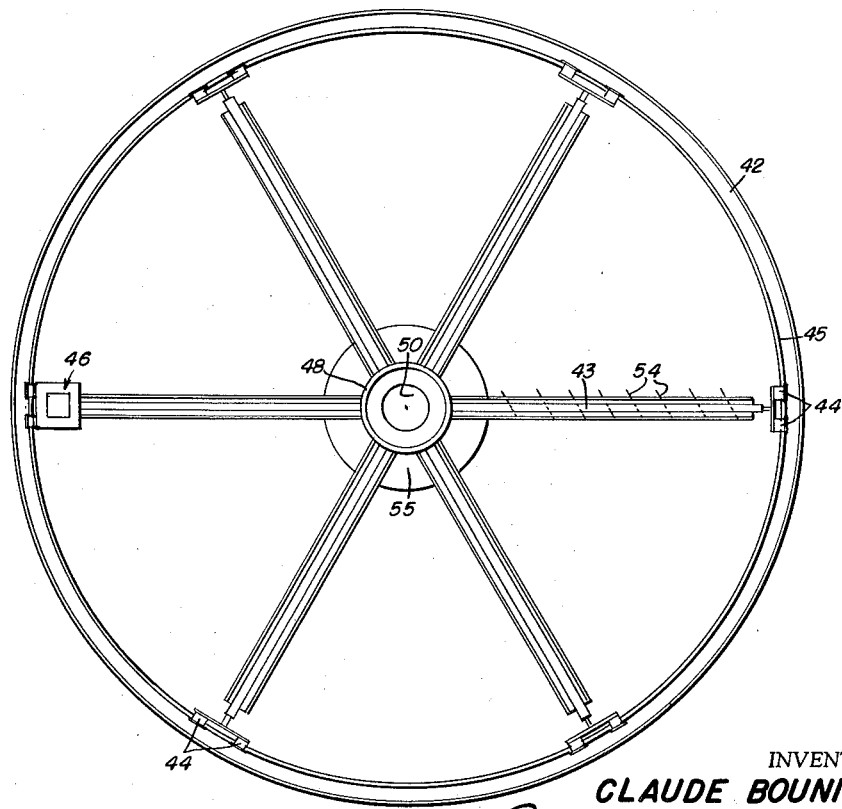
INVENTOR
CLAUDE BOUNIN
ATTORNEYS

United States Patent Office 2,899,071
Patented Aug. 11, 1959

2,899,071

METHOD AND APPARATUS FOR ACCELERATING THE DEGREE AND RATE OF SEPARATION OF SOLIDS FROM LIQUIDS

Claude Bounin, Paris, France

Application November 21, 1955, Serial No. 547,950

Claims priority, application France November 25, 1953

7 Claims. (Cl. 210—527)

This invention relates broadly to the art of separating solids from liquids.

This application is a continuation-in-part of my prior filed application, Serial No. 430,947, filed May 19, 1954, entitled Decanting Liquids Containing Flocculated Material, and now Patent No. 2,816,661, dated December 17, 1957.

In the art of separating solids from liquids there have been numerous developments intended to facilitate the degree and rate of separation. This art is of considerable applicability in industrial processes where it is desirous of either obtaining a clarified liquid or a solids recovery product from a suspension.

It is therefore the primary object of the present invention to provide apparatus for accelerating the degree and rate of separation of solids from liquids which increases the capacity of vats, decanters, tanks or other suitable containers for the solids-liquids suspension and increases the thickness of the underflow.

It is a further object of this invention to provide an arrangement for facilitating the settling of solids from liquids which includes means supporting and moving solid bodies of thin cross section in relation to their extent in the direction of the movement through a suspension of solids and liquids at a speed below that at which eddy currents are established in a suspension particularly in the liquid phase thereof and thus at a speed below that which could produce agitation while simultaneously deflecting the solid and liquid portions of the suspension to flow downwardly by disposing the bodies at an acute angle to the direction of movement of the bodies to facilitate settling of the solids below the bodies and separation of liquid from the solids.

A further object of this invention is to provide apparatus for carrying out the aforementioned mode of operation regardless of the configuration of the means that confine the suspension.

In connection with the separation of solids from liquids it is to be borne in mind that the present invention is applicable to virtually all conditions in which the insoluble solid particles are able to overcome by their own weight the viscosity of the liquid in which they are contained. For example, a suspension of sand, the particle size of which does not exceed 100 mesh. Further the invention is applicable under conditions where flocculation is used such as where a flocculating reagent, as starch, is added to bauxite pulp or potassium chloride pulp.

Generally speaking, where a suspension is confined in a tank or vat and it is desirous of recovering either the liquid phase or the solid phase, the movement of particles through the liquid phase is due to some force imposed upon the particles. Either gravity or conglomeration or flocculation of particle to particle to facilitate settling. Thus in the vat there are four vertically arranged zones commencing from top to bottom: (a) The zone of free settling or of independent subsidence where the particles or flocs settle independently. In other words, gravity has a kinetic action upon the descent of particles in the liquid with the settling rate being dependent upon the size and density of the particle or floc. (b) A zone of collective subsidence where the settling rate decreases with the increase in concentration of solids. In other words, where particles begin to agglomerate more or less horizontally. Thus the settling rate is influenced by particle or floc interference one with the other so that at least some particles receive or deviate horizontally during settlement. (c) The zone of compression subsidence where flocs and particles are increasing in concentration to the extent that they press one upon another in the vertical direction as well as being more closely agglomerated horizontally. (d) The settling zone, where the particles do not have any apparent speed of subsidence but move downwards due to the weight of and increasing concentration of the superjacent particles.

The present invention therefore is concerned with facilitating the concentration of solids in the respective zones in such a fashion that the rate of separation is substantially enhanced. Essentially the present invention comprises solid surfaces, means for supporting such surfaces at an acute angle and for moving them through one or more of the zones at a peripheral speed below that at which eddy-currents would be set up and which surfaces impart a deflecting action since they are at an acute angle downwardly to their direction of motion. Therefore the present invention provides for facilitating settling of solids from liquids and thickening of the concentration by imparting to the solids and liquid phases of downward components of force which are sufficient to accelerate agglomeration and coherence of particles, but which are insufficient to disrupt previously adhered particles. From another aspect the invention improves settling and thickening by providing for the escape of minute liquid phases that are entrapped between agglomerated particles.

Specifically by moving one or more vanes or blades disposed at an acute angle to the direction of movement at a slow speed of the order of a peripheral velocity between 2 and 40 feet per minute the solid particles having a weight or density sufficient to overcome the viscosity of the liquid will be deflected from the bottom of the blade downwardly so as to accelerate their rate of settling relative to the liquid even though the liquid phase is likewise deflected.

The movement of the solids-liquid phase past the trailing edge of the angularly positioned vane or blade provides an increased liquid separatory effect at the trailing edge particularly in the compression zone and settling zone.

As another advantage of the present invention the top surface of the blade or vanes acquires a film of solids in the free settling zone and zone of collective subsidence which increases the capacity of processes of decanting.

Accordingly, the present invention provides an apparatus for use in solids-liquids separation particularly in decantation processes in which solid surfaces are displaced while at an acute angle to their direction of displacement through all of the above mentioned zones.

As a specific object the invention provides an arrangement in which the surfaces are curved and in which planes lying in the chord of the curvature of the blades are at an acute angle to the direction of displacement.

In connection with the degree of angularity and the speeds of displacement it is to be pointed out that different industrial processes utilizing this invention will give rise to different conditions. Consequently, the angularity can vary as well as the speed to suit the conditions of decantation or thickening. I do not wish to be limited to any one particular angle or speed. However, it has been discovered through extensive research and testing and in actual operating conditions that while a preferred degree of angularity is from 15 to 20 degrees the invention has produced improved results in angularity ranges between 5 and 45 degrees. Concerning the speed, the optimum speed will vary in dependence upon the nature and original consistency of the suspension. It is to be emphasized however that this invention is particularly concerned with what can be termed very slow peripheral velocities. Thus, the improved results of this invention have been obtained in instances where the blades were moved at a speed of about an inch a minute to instances up to 40 feet per minute.

Figure 6:
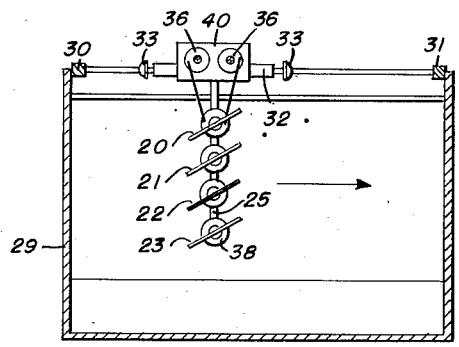
Figure 7:
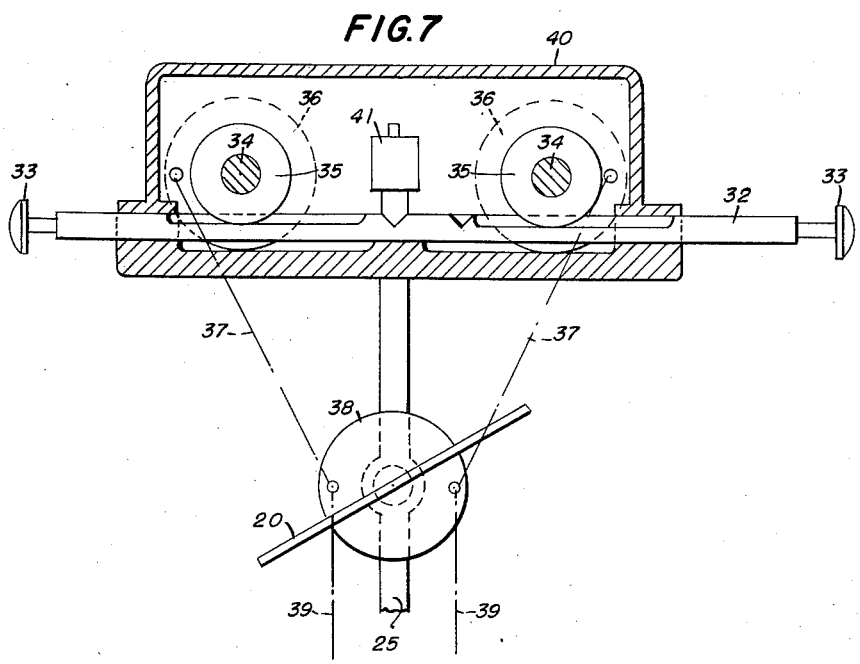

It is further to be pointed out that the present invention is not to be limited to any particular configuration of the tank or vat since the process of this invention is equally applicable in circular or square vats of the various conventional constructional formation. Further and more specific objects will be apparent from the following description taken in connection with the accompanying drawings in which:

Figure 1 is a perspective view illustrating one of the blades,

Figure 2 is a diagrammatic side elevational view illustrating one arrangement wherein the blades are in direct superimposition and in vertically spaced relationship, Figure 3 is a view similar to Figure 2 but illustrating a modified form of the invention in which the blades are mounted in vertically staggered relation, Figure 4 is a diagrammatic longitudinal sectional view partly in elevation and with parts removed illustrating the invention as applicable to any thickening or decantation apparatus, Figure 5 is a cross sectional view illustrating the invention as applied to a rectangular vat or tank and further illustrating a modified form of blade or vane structure, Figure 6 is a longitudinal sectional view of the vat structure shown in Figure 5, Figure 7 is a fragmentary cross sectional view illustrating in detail and on an enlarged scale a portion of the structure shown in Figure 6, Figure 8 is a diagrammatic view in vertical cross section and with certain parts in elevation illustrating one form of apparatus embodying the invention, Figure 9 is a top plane view of the arrangement shown in Figure 8.

In the drawings the invention has been indicated diagrammatically being borne in mind that the details of tank or vat structure form no part of the present invention since such structures are conventional.

As shown in Figure 4 the lefthand side of the illustrated tank 1 has been diagrammatically delineated in zones including an upper zone A denoting effluent or clarified liquid which escapes over a weir 2, a next succeeding zone B which is the zone of free settling or independent subsidence. The following zone C is the zone of collective subsidence. The next zone D is the zone of compression subsidence and finally the zone denoted at E is the settling zone. The drawing has been shaded to indicate increasing concentration from top to bottom. The suspension is supplied through a central inlet 3 about which are mounted a plurality of radially extending arms 4 supported at their outer periphery by rollers contacting a ramp or rail on the rim of the vat which in this form is circular.

Depending from each of the arms 4 are supporting rods 5 on which are mounted blades 6. In the arrangement illustrated in Figure 4 there are three sets of blades on each radial arm with each set incorporating a plurality of vertically spaced blades and the blades in each set having the same length and transverse dimensions. Suitable means rotate the assembly of arms 4 and blades at speeds which will be more fully disclosed hereinafter. Since the bottom of the vat 1 is inclined downwardly toward the center a raking mechanism is suspended beneath the sets of blades. While raking mechanisms are conventional in decanting apparatus as will be described hereinafter, the rakes used with the present invention are arranged differently from those in the prior art.

Bearing in mind that the peripheral velocity of the blades is very slow and, as will be shown in examples set forth hereinafter, can vary from the speed of approximately 1 inch per minute to speed not exceeding 40 feet per minute, the blades are arranged in the vat in such number and dimensions that the total surface area of the blades varies between ½ and the total surface of the body of the suspension in the tank or, in other words, the total surface area of the blade structure is at least ½ and generally does not exceed the total surface area of the tank.

Further the peripheral speed of movement of the blades through the suspension will vary in accordance with the particular suspension being treated since different suspensions embody solids having different speeds of separation or rates of settlement. Therefore, in a suspension in which the rate of settlement is comparatively rapid the present invention permits the movement of the blades at a higher rate than if the rate of settlement of the solids was a slow rate or, in other words, in instances where the suspension had lighter solid particles. While empirical formulae have not been devised that will suit all possible applications of this invention, through extensive tests I have discovered that the speed of rotation is a function of the weight of a solid particle in relation to the viscosity of a suspending medium.

The angularity of the blades with respect to their direction of movement is another variable factor of this invention. The blades in Figures 1–4 and 8 and 9 are curved blades while those of Figures 5–7 are flat or planar surface blades. The angularity of the blade, that is either the angle between the chordal line of a curved blade and the horizontal or the angle between the flat blade and the horizontal can vary between 5 and 45 degrees. Thus in all instances my invention contemplates moving blades through a suspension at an acute angle to the direction of movement. A particularly efficacious angle which has found satisfactory results in actual operating conditions is one between 13 and 17 degrees. The pitch of the blades where they are curved is preferably 15% of the length of the chord between the leading and trailing edge of the blade.

The size of the individual blades will vary with the size of the container. However, the chordal length of each blade should be approximately ⅓ the length thereof where the blade arrangement is as shown in Figures 4, 7 and 8 in which plural groups of blades are mounted on each radially extending supporting arm. In other words, in such arrangements the blades in each group have approximately the same length in the radial direction. Further the blades of this invention are to be thin as regards their extent in the direction of movement and thus for a blade approximately 8 feet long its thickness should be of the order of less than ⅓ of an inch.

In Figure 1 there is disclosed what I might term the basic concept of this invention as applicable to a single blade. The direction of displacement is indicated by the arrow and the blade 6 is suitably mounted in the container so that it is at the angle which, as stated, can vary between 5 and 45 degrees. The particular angle illustrated in Figure 1 between the horizontal or direction of displacement and the chord connecting the leading and trailing edges of the blade is approximately 15 degrees.

In Figure 2 the angularity of the blades 6 has been more clearly illustrated and that the angle between the chord line 7 and the horizontal at 8 is approximately 15 degrees.

The same angle relationship is shown for the blades 9 and 10 mounted on opposite sides of vertical supporting structures 11, as regards the direction of displacement indicated by the arrow.

The triangular wings 12 present in Figures 2 and 3 are one suitable means of connecting blades to the supporting rods or structures 11.

Obviously many ways known in the art are available for connecting the blades to the vertically disposed supporting structures.

For example, the vertical structures or struts can be of square cross section with a corner facing the direction of movement, the blades suitably notched on their leading edge and welded to the side surfaces of the square sectioned strut. Obviously the shape of the vertical strut is immaterial so long as the blades are suitably fastened thereto.

It is further emphasized that the movement of the blades in accordance with the present invention imparts a downward component to the particles when they engage the undersurface of the slowly moving blades and the blades are so moved through the suspension that only downward components are applied to the solid particles. This is especially true in circular vats or tanks where the radial arrangement of blades receives constant movement through the suspension with each blade being maintained substantially in the same relative position in the vat.

The vertical spacing between the blades in the arrangement as in Figure 2 is generally such that the space between the leading edge of succeeding blades is approximately double the perpendicular distance between the leading edge and the horizontal plane containing the trailing edge.

Where blades are arranged as in Figure 3 the vertical spacing between the leading edge of the following blade 10 and the trailing edge of the leading blade 9 should be at least equal to the vertical distance between the leading edge of a blade and the horizontal plane passing through the trailing edge.

It is, of course, possible that in treating certain suspensions the vertical spacing between the blades will be varied, but the foregoing spacing relationships have been found to provide satisfactory results in operations in different type suspensions.

It is further to be emphasized that no empirical formalae are at present available to determine the precise dimensions and other factors of this invention. However, operational results as set forth in examples given hereinafter will adequately demonstrate that there is a relationship between the angularity of the blades and the rate and degree of separation and the peripheral speed of movement of the blades and the rate and degree of separation and thus the thickness of what is usualy termed the underflow in decantation processes.

Thus the invention from one broad aspect provides for the downward displacement of particles in the different vertical levels or zones of settling and in which the rate of movement of the deflecting surfaces is controlled to be at such a slow velocity in relation to the rate of settlement that thickening and increased concentration of solids in the succeeding zones from top to bottom of a vat is accelerated rather than retarded by agitation effects.

It is further to be pointed out that this invention includes the concept of moving a single blade through a suspension at an acute angle to the horizontal within the range of 5 to 45 degrees within the speed ranges recited and where the length of the blade from leading to trailing edge is sufficient that the solid surface extends from within the zone of free settling to at least within the zone of settling at the bottom. Experience has proven that while a planar blade will afford increased thickening and increase the capacity of a given size apparatus, the results are further improved when blades curved as described hereinbefore are utilized.

It is also to be pointed out that it is not absolutely essential that the blades be disposed in all of the zones of settling in the decanter. In other words, my invention contemplates the displacement of the acute angle blade or blades, preferably curved, through one or more of the several settling zones disclosed hereinbefore.

In the constructional example illustrated in Figures 5–7 there is disclosed a generally rectangular vat 29 having downwardly tapering sides to form a tapered bottom. Suitable outlets and raking means not shown, which are conventional, are associated with this vat. The deflecting surfaces in this form of the invention comprise four blades 20—23. These are solid planar blades. The blades are pivotally mounted upon vertically disposed arms 24 and 25 so as to be turnable about horizontal axes. The arms 24 and 25 are fixed to a horizontally disposed frame 26 supported by spaced wheels 27—28 engaged on suitable rails formed on the top of the vat. Supported by the frame 26 is a driving mechanism denoted generally at 40 which includes motor operated means for transmitting driving force to the wheels 27, 28 and also means for reversing the angular position of the blades 20—23. The reversing mechanism includes, as in Figure 7, gear wheels 35 mounted on driven shafts 34 and respectively enmesh with a rack 32 slidably mounted in the frame 26. At each end of the rack 32 is a buffer 33 resiliently mounted relative to the ends of the rack and operable to engage abutments 30 and 31 fixed to the opposite ends of the vat or tank. Each of the rock shafts that carry the respective blades 20—23 include at one or both ends a disc structure 39, the upper one of which is connected by chains 37 to the respective gears 35. Connecting chains or cables or rods 39 extend between the uppermost discs 38 and those on the subjacent rock shafts.

Thus, as shown in Figure 6, the blades 20—23 when moving from left to right are at respective acute angles to the direction of displacement when the carriage reaches the end of its travel to the right. In Figure 6 the buffer 33 strikes fixed abutment 31. This displaces rack 32 to the left turning gear wheels 35 with the result that the surfaces of the blades are reversed and assume symmetrical relationship in the opposite direction. The carriage drive mechanism is likewise reversed and the carriage and blades travel from right to left where the other buffer 33 engages the fixed abutment 31 to again reverse the inclination of the blades.

The details of the drive for the carriage and the control of the reversing movement thereof have not been shown since these are well known technical structures in other arts. The present invention contemplates the reversal of the angularity of the blades responsive to the movement of the carriage. Suitable stop means, not shown, are incorporated with the gears 35 to limit their turning movement so that the angular position of the blades is within the range of this invention. The numeral 41 indicates a lock means that can be moved vertically to prevent movement of the rack relative to the carriage.

Figure 8 illustrates a further embodiment of the invention wherein the vat 42 is circular and the blade arrangement is suspended from radial arms 43 having supporting rolls 44 at their outer ends that engage a rail structure 45 which is illustrated as being on the inside of the tank. Suitable drive means denoted generally at 46 drive the supporting rolls mounted on one of the arms 43. Depending from each arm is a blade arrangement indicated generally at 47. The blades are indicated diagrammatically. However, they are in elevation as shown in Figure 2. The suspension to be thickened is introduced centrally as is conventional through the interior of baffle 48 and the slurry or recovered solids component is discharged through suitable underflow apertures or conduits 49. The central column structure 50 rotatably supports a sleeve 51 from which extend radial arms 52 each underlying one of the arms 43 and forming the lowermost part of a frame structure that supports the blade arrangements 47. Depending beneath the arms 52 are rake elements 54 which, as shown in Figure 9, are curved and so arranged that the chord connecting the leading and trailing edges is at an acute angle to their direction of displacement. These rakes 54 are vertically positioned. It has been established through operation of conventional thickeners that the flow of solids at the base of a decanter having a central discharge opening in the bottom is generally in the form of a spiral. In many instances the rate of movement of solids along the bottom of a decanter as assisted by the rakes is too rapid so that the underflow or slurry is unduly diluted. I have found that in combination with my angularly positioned curved blades at an angle to the horizontal and extending through the several zones of settling in a tank, an arrangement of vertically positioned curved blades acting as rakes and likewise angularly disposed at an acute angle to the direction of displacement also assists the increase of the concentration of liquids in the underflow. The curved rakes furnishing less resistance to their passage through the bottom of the settling zone where the solids concentration is thickest.

Another improvement embodied in Figures 8 and 9 is a conical shield structure 55 extending between the central column and the lower supporting struts or arms 52. This shield insures that the central discharge is only the thickened solids phase because it forms between the bottom of the container and the lower edge of the shield a restricted outlet which prevents short circuiting due to hydrostatic circumstances. In other words, the possibility of a vortex action at the central discharge is eliminated so that only thickened slurry or solids can be discharged.

It is, therefore, pointed out that:

(1) The inclination of the solid blade or blades and its angularity preferably 13° to 17° with respect to the direction of movement produces a vertical component of force on the particles as a result of the movement, no matter how slow, of the blade, the effect of which is additive to that of the force of gravity, thus promoting decantation.

(2) The slow movement of solid blades at an angle through the suspension produces a deflection of the slurry which promotes decantation and settling.

(3) Therefore, the process of this invention achieves at least three principal objectives:

a. It does not break up particles or flocculates in the course of settling.

b. It accelerates decantation, and c. It positively promotes settling of particles or flocculates on the bottom of the decanters or tanks.

Thus the slow and controlled movement of the blades during decantation avoids the destruction of particle or flocculate structures which have been formed naturally or artificially by flocculation (which would redisperse the muds and retard their settling). The result is that chains and bridges of water that slow down decantation of the particles or of the flocculates, break down readily. Therefore, the concentration of thickened products in the settling phase is increased.

As one example of the present invention, I have applied my process to the first stage washing of bauxite muds in an aluminum plant. Supplementary flocculation is not normally applied to the vessel containing this first washing stage. Extensive runs utilizing my invention have been made in which performances were compared with that of two conventional decanters utilizing only conventional rake structures.

In this example, the vessel, which we will denote as A, was equipped with solid flat blades. Vessels, denoted as B and C, were operated concurrently with the test vessel. All decanters or vessels were 33 feet in diameter and 15 feet in height. In the vessel A were arranged two diametral arms each of which supported a plurality of blades arranged at an angle of 25° to the horizontal. The blades were spaced vertically from one another so that the leading edge of one blade was above the next lower blade a distance equal to the perpendicular from the leading edge of a blade to a horizontal line passing through the trailing edge. The blades are 8 inches from front to rear and the blades were disposed throughout substantially the vertical dimensions of the vat from immediately above a conventional raking means. As stated, B and C did not incorporate blades.

All three decanters were operated at a feed rate of 17 cubic meters per hour of a bauxite mud suspension having the following average specification:

| | Grams per liter |
|---|---|
| $Fe_2O_3$ | 100 |
| $Al_2O_3$ | 37 |
| Caustic (as $Na_2O$) | 66.6 |

The temperature of the mud suspension at the inlet was approximately 90° C. The feed to decanters A and B was identical and consisted of a suspension which had been flocculated in the same manner in both cases. The suspension which was fed to decanter C was given only a residual flocculation arising from a flocculation in a previous stage.

The blades were moved at a peripheral speed of 16 feet per minute.

Over a period of 75 days the following average concentrations of the insolubles in the thickened products were obtained:

| | Grams per liter |
|---|---|
| Vessel A | 405 |
| Vessel B | 324 |
| Vessel C | 284 |

The concentration obtained in vessel A was thus 25 percent higher than in vessel B and 42 percent higher than in vessel C.

The blade equipped vessel was also tested on its ability to operate on higher throughputs. For this purpose the intake of the vessel was increased to 34 cubic meters per hour by feeding to it the combined intake material of vessels A and B. At this double throughput the effluent of vessel A remained as clear as it was originally, while the concentration of the thickened mud was still 10 percent higher than of the material obtained in vessel C.

As a second example, operations were effected in the same plant, with the same material as in the above example and in the same tank with the difference that the blade structure of vessel A was replaced by curved blades mounted in diametral arrangement with 12 blades on each side of the axis. The 12 blades on each side were arranged in two groups of 6 vertically spaced blades. Each blade was 2 feet along the chordal line, the pitch of the blade was approximately 12 percent of the chordal distance and each blade was 8 feet long. Vessel A re-equipped with these curved blades and now designated as vessel $A_1$ was operated simultaneously with vessels B and C under the same conditions as before.

The blades were moved at a peripheral speed of 8 feet per minute.

The average concentrations reached in vessel $A_1$ was approximately 500 grams per liter, whilst in vessels B and C the concentrations were, as before, approximately 320 and 280 grams per liter, respectively.

It is to be noted that until the tests were made the high concentration of 500 grams per liter which was obtained by the process of the invention had not been thought possible for the mud in question.

Tests were then also made with doubling the feed rate. Operating vessel $A_1$ under these conditions it showed a concentration of solids in the underflow of slightly over 400 grams per liter.

As a further example, the present invention was applied on an industrial scale in the potash industry. A double-decked decanter having a diameter of 82 feet which was used to clarify and thicken pulps of potassium chloride obtained by flotation. Such pulps contained on average approximately 20 grams of insolubles per liter. The decanter was equipped with one diametral arm on which on each side of the axis were mounted series of curved blades. The decanter had a sloping bottom and a central outlet so that the blades were arranged in groups. Since the blades were of the same configuration and dimensions as the curved blades mentioned in the preceding example, there were 5 groups of blades in alignment in the radial direction from the central part of the decanter to the outer periphery of the supporting arms. In view of the downwardly sloping bottom, the blades were, of course, displaced downwardly toward the center in the manner as shown in this application.

The blade arrangements were superposed on a conventional thickener rake structure. In addition to the main diametral arrangement of blades, there were 2 groups of blades mounted on each side of the axis and extending perpendicular to the diametral groups. This short arm blade arrangement comprised 6 blades on each side of the axis of rotation mounted in two groups of 3. The spacing between the blades was as indicated hereinbefore. The blade arrangement was driven at a peripheral velocity of 8 feet per minute.

Two types of extensive test runs were made. The first run was designed to establish the amount of thickening that could be obtained when operating at standard rates of throughput. The second run was designed to determine the throughput that could be obtained with a normal degree of thickening.

In the first series of runs the decanter equipped with the blades, hereinafter referred to as decanter A, as well as a control decanter of conventional design (decanter B), had an input of 250 cubic meters per hour of potassium chloride pulp each. Over a period of more than three weeks the following approximate average concentrations of insolubles in the underflow were obtained.

| | Grams per liter |
|---|---|
| Decanter A | 500 |
| Decanter B | 360 |

In the trial to determine the increased throughput that could be obtained with the bladed device, it was found that the intake of decanter A could be doubled to 500 cubic meters per hour, while maintaining the concentration of solids in the underflow at 350 grams per liter.

It is further to be pointed out that the present invention is not to be restricted to the utilization of metal blades. I have ascertained that blades made out of plastics, such as, polyethylene, poly vinyl chloride, fiber glass-polyester resin mixes are satisfactory. The use of plastic blades in many instances will result in savings in installation costs by cutting down the weight of the blade installation.

The blades, therefore, can be constructed of any suitable material.

I further wish to point out that the underflow discharge shielding structure 55 in Figure 8 can be modified in its configuration. Thus, instead of being what is termed a conical shielding member as shown, the shielding member could have an arcuate upper surface, that is, be part of a sphere.

The important factor in connection with this shield structure is that it have a downwardly and outwardly directed slope whether the slope is straight or curved.

Additionally, I want to emphasize that my invention, as regards the displacement of the blades, is to be construed to relate to only arrangements that in operation do not impart upward components of force to the phases of the suspension.

Of course, in Figures 5 to 7 when the blades reverse, that movement will in a very restricted zone of the suspension produce a slight upwardly directed force. However, this slight action does not adversely effect the invention. Therefore, the present invention comprehends the moving of the blades through the suspension and while they are being displaced in their direction of movement, they are to exert substantially only downwardly directed deflecting actions.

Thus in the Figures 5 to 7 arrangement, the effective action of the blades while being displaced is only that of imposing a downwardly directed force on the suspension which in view of the small speed or rate of movement is effective to accelerate settling.

What is claimed is:

1. In apparatus for effecting the separation of solids from liquids in suspensions of the type wherein the solids have sufficient weight to eventually settle by gravity the improvement comprising a tank for confining a body of suspension fed thereto, said tank having a lower settled solids outlet and an upper effluent outlet, a plurality of imperforate blades, supporting means for the blades mounting all of the same at substantially the same acute angle and with the same pitch to the horizontal and at closely adjacent vertically spaced levels above the bottom of the tank and means for slowly horizontally displacing the supporting means and thereby the blades so that the latter always present during such horizontal displacement a downwardly facing surface which deflects the mass of suspension and exerts a downward component of force on solids and liquid, said blades being thin in cross section in relation to their extent in the direction of displacement and having a total surface area that is large in relation to the surface area of the suspension.

2. Apparatus as claimed in claim 1 in which the blades are flat.

3. Apparatus as claimed in claim 1, in which the tank is rectangular in cross section, the supporting means and the means for displacing the same comprising a carriage movable to and fro across the top of the tank, means for so moving the carriage including means for reversing the direction of movement of the carriage at each end of its travel, said carriage including turnable means mounted for movement about horizontal axes, said blades being carried by the turnable means, and means for turning the turnable means when the carriage reaches the end of its travel in one direction so that the angularity of the blades is reversed and the same always present a downwardly facing surface during horizontal displacement of the carriage.

4. Apparatus as claimed in claim 1, in which said tank is circular, the solids outlet being centrally disposed, said supporting means for the blades comprising vertical shaft means and a plurality of arms extending radially thereof, said tank having a bottom sloping downwardly to the centrally disposed outlet, said blades being curved and rake means beneath the lowermost blades comprising vertically positioned curved blade elements mounted with the chord connecting the leading and trailing edges at an acute angle to their direction of displacement, said rake elements being thin in relation to their extent in the direction of displacement, and said first-mentioned blades being vertically spaced apart a distance less than the extent of a blade in the direction of displacement.

5. Apparatus as claimed in claim 1, in which the blades are curved blades with their concave surface being the leading face.

6. Apparatus as claimed in claim 1, in which the vertical spacing between the blades is less than the extent of a blade in the direction of displacement.

7. Apparatus as claimed in claim 1, in which the total surface area of the blades is at least one-half the surface area of the confined body of suspension.

References Cited in the file of this patent

UNITED STATES PATENTS

| | | |
|---|---|---|
| 628,378 | Wymonde | July 4, 1899 |
| 1,605,596 | Langelier | Nov. 2, 1926 |
| 1,842,938 | Hancock | Jan. 26, 1932 |
| 1,851,684 | Pruss | Mar. 29, 1932 |
| 1,879,135 | Downes et al. | Sept. 27, 1932 |
| 2,000,418 | Ruth | May 7, 1935 |
| 2,301,461 | Schnetz | Nov. 10, 1942 |
| 2,361,283 | Good | Oct. 24, 1944 |